Oct. 7, 1947.  J. HALLER  2,428,493
STOCK FEEDING MECHANISM FOR PUNCHING, STAMPING, AND CUTTING MACHINES
Filed Feb. 8, 1945  6 Sheets-Sheet 5
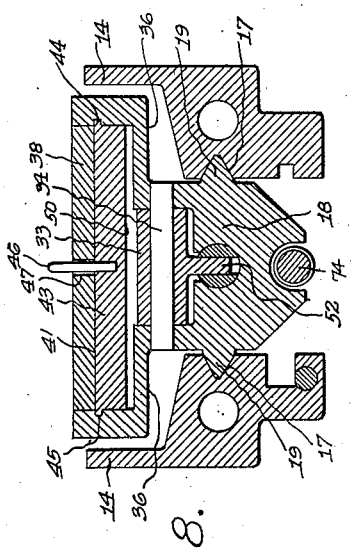
Inventor
John Haller
By Barthel & Bugbee
Attorneys

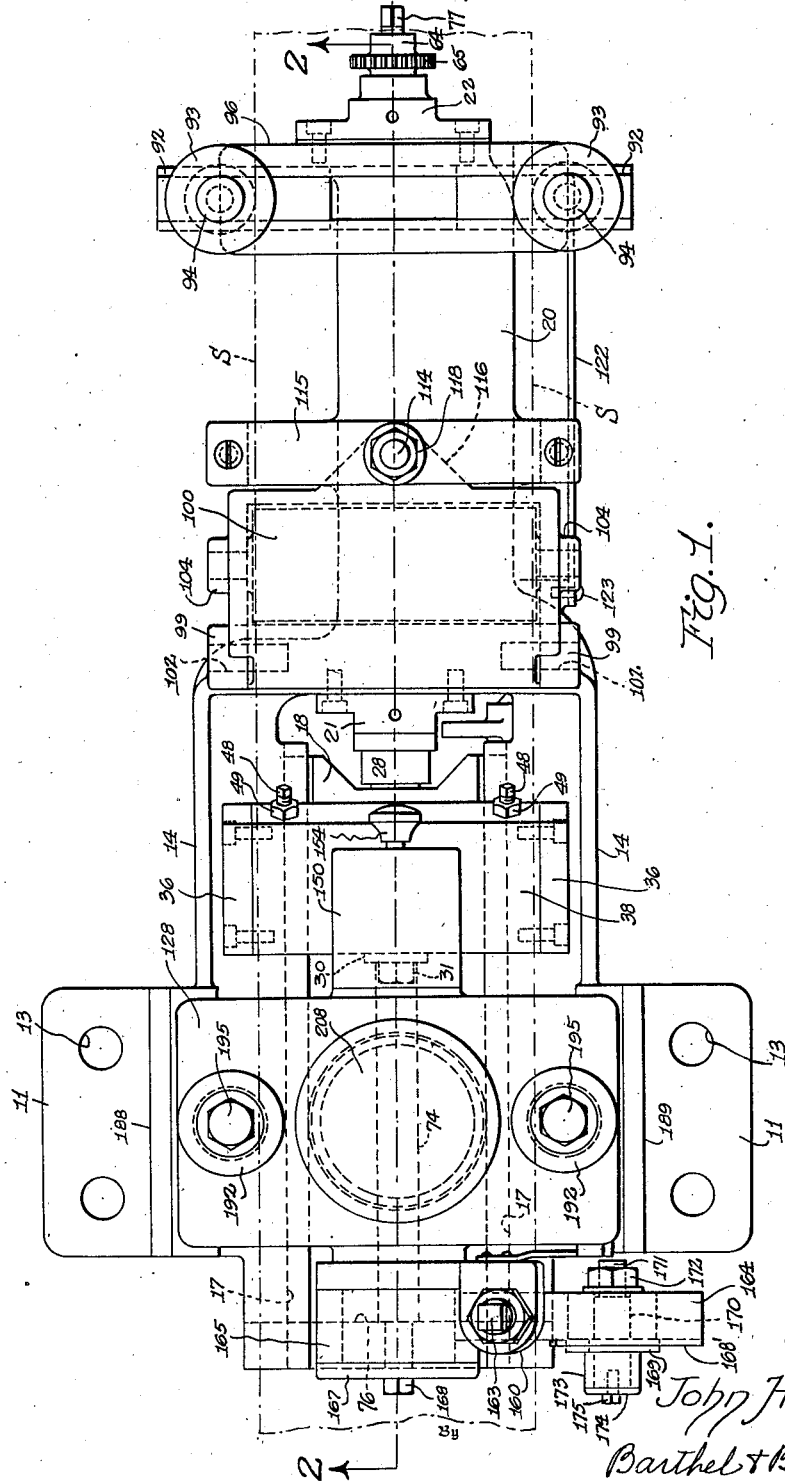
Oct. 7, 1947.     J. HALLER     2,428,493
STOCK FEEDING MECHANISM FOR PUNCHING, STAMPING, AND CUTTING MACHINES
Filed Feb. 8, 1945     6 Sheets-Sheet 1
Inventor
John Haller
Barthel & Bugbee
Attorneys Oct. 7, 1947.  J. HALLER  2,428,493
STOCK FEEDING MECHANISM FOR PUNCHING, STAMPING, AND CUTTING MACHINES
Filed Feb. 8, 1945  6 Sheets-Sheet 2
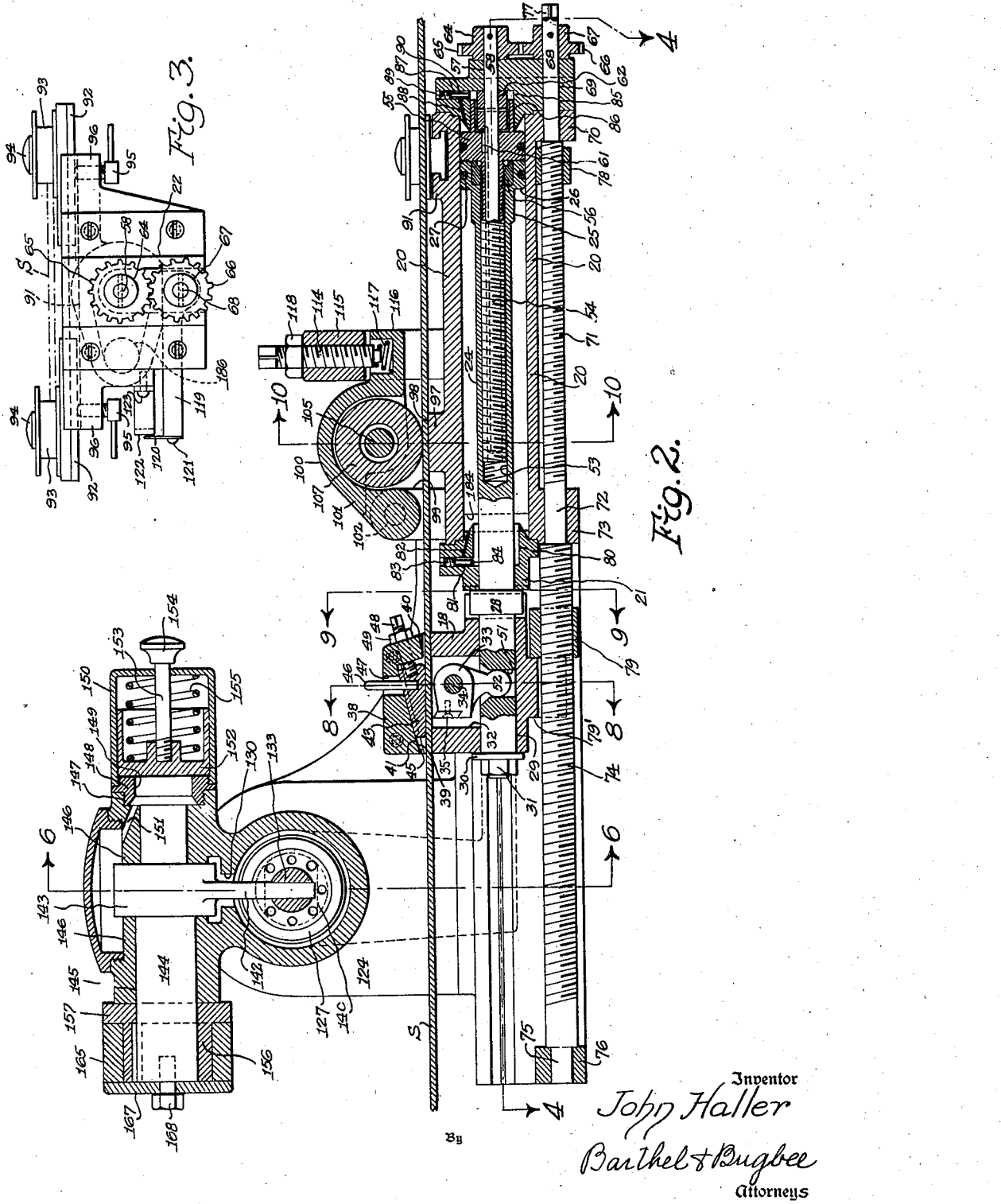
Inventor
John Haller
By
Barthel & Bugbee
Attorneys

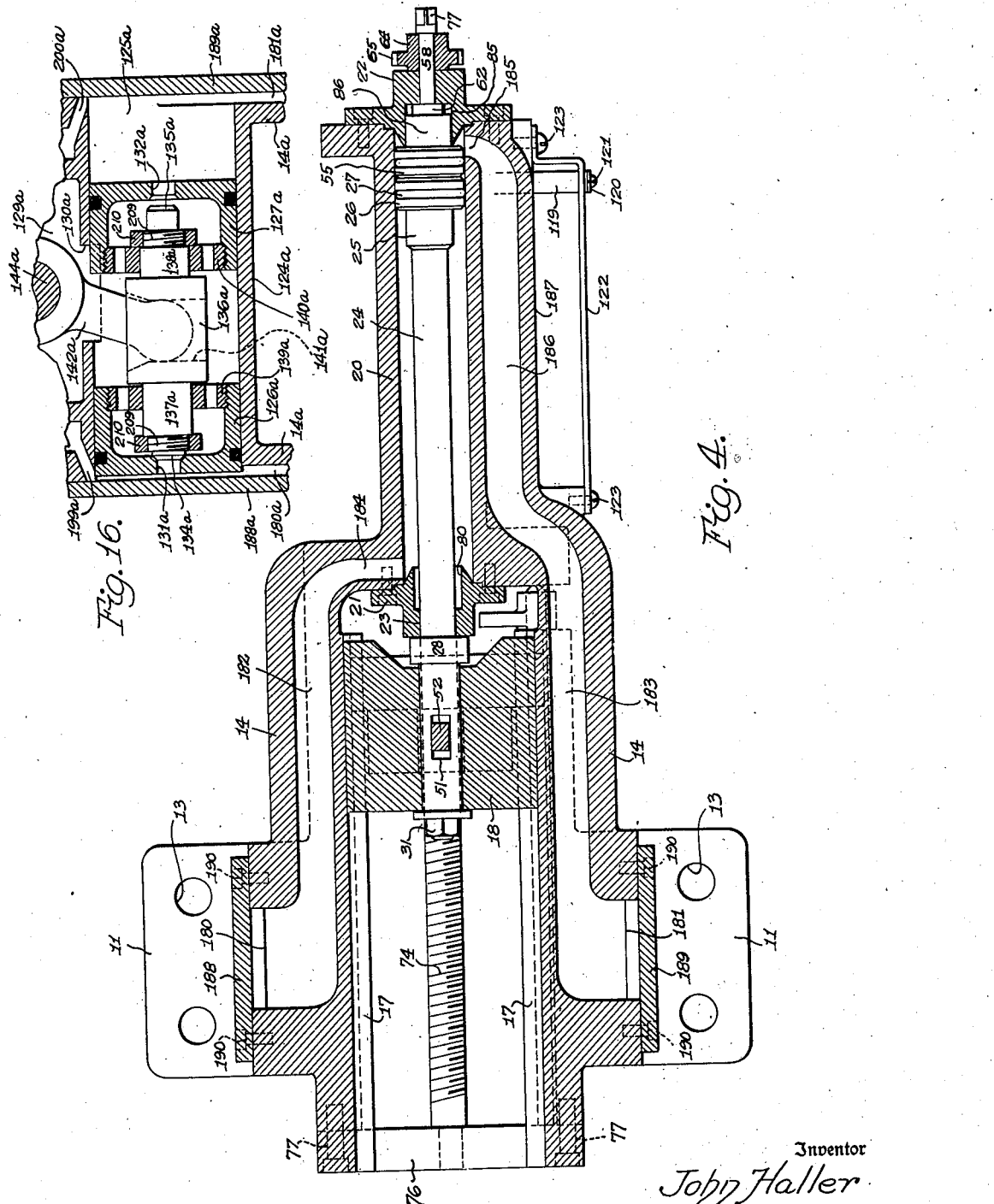

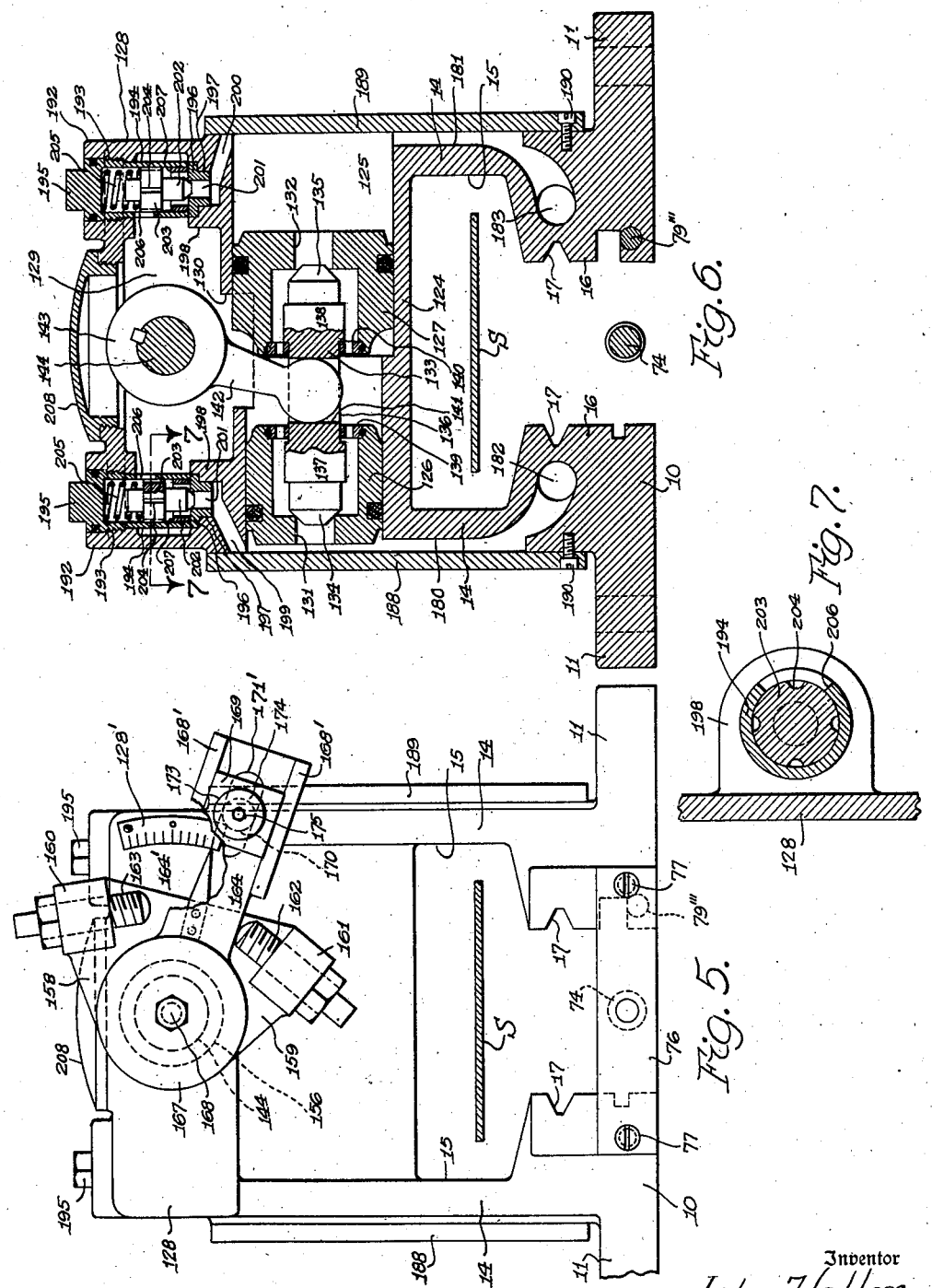

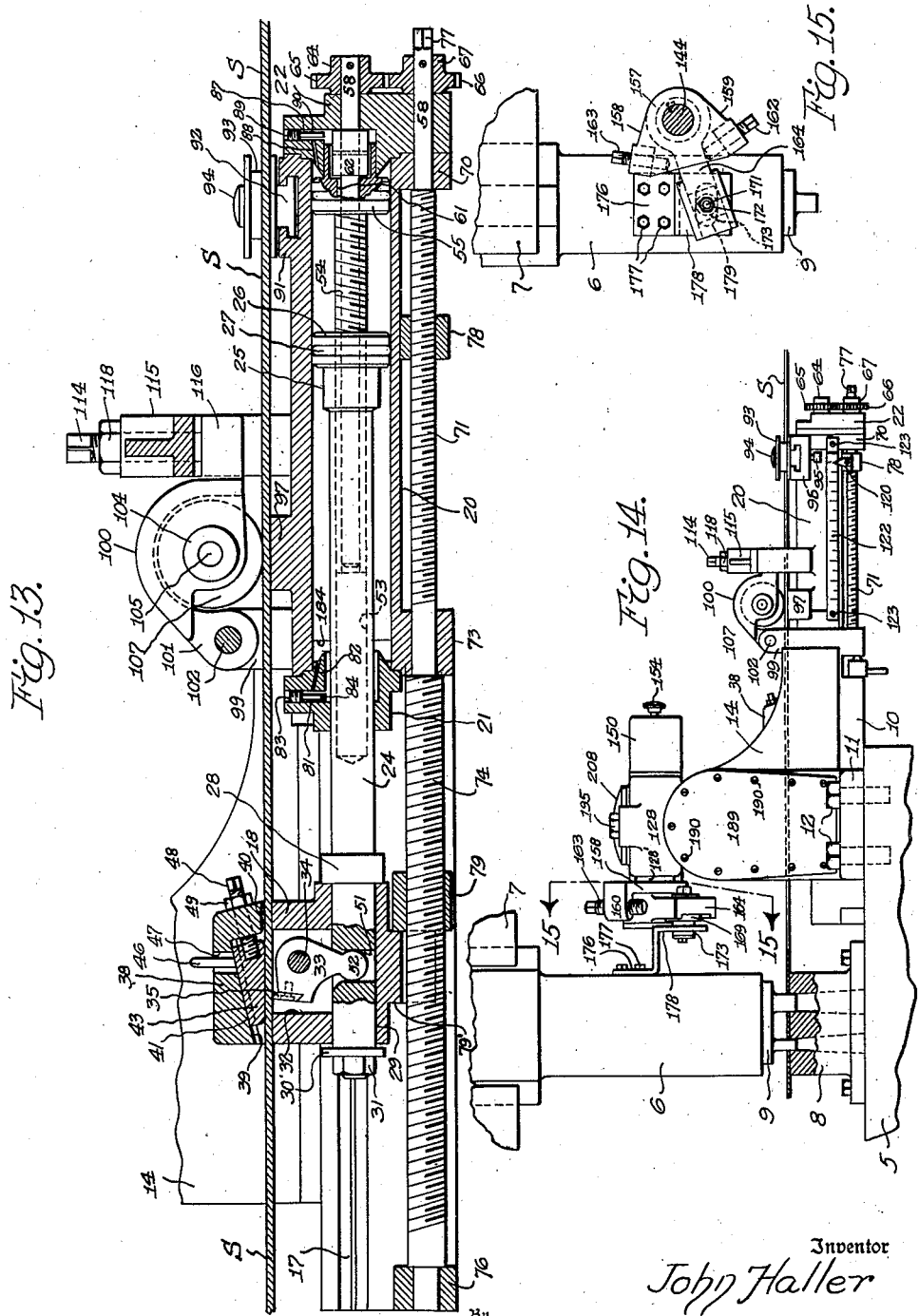

Patented Oct. 7, 1947

2,428,493

UNITED STATES PATENT OFFICE 2,428,493

STOCK FEEDING MECHANISM FOR PUNCHING, STAMPING, AND CUTTING MACHINES

John Haller, Northville, Mich.

Application February 8, 1945, Serial No. 576,821

24 Claims. (Cl. 164—117)

The present invention relates to improvements in automatic feeding mechanism for cutting, punching and stamping machines, and more particularly, to a feed mechanism for feeding strips of stock between the die members of said cutting, punching and stamping machine.

The primary object of the invention is to provide an intermittent feed mechanism for stamping, cutting and punching machines which is operated hydraulically by the reciprocation of the ram head of the machine and arranged to intermittently feed strip stock of various lengths between the die members of said machine so as to facilitate the cutting, punching and stamping of blanks of different sizes and shapes.

Another object of the invention is to provide a feed mechanism for cutting, punching and stamping machines which is adapted to be operated hydraulically by the movement of the ram head of said machine in such a manner as to cushion and eliminate shock and vibration at the ends of the reciprocating stroke of the feed mechanism and thereby prevent damage to the reciprocating feed mechanism when the same is operated.

Another object of the invention is to provide a feed mechanism for cutting, punching and stamping machines in which a nicety of control is obtained in the feeding of the strip stock between the die members of said machine so as to permit the cutting, punching and stamping of a maximum number of blanks without wasting material and thereby creating a saving in machine operation.

Another object of the invention is to provide a feed mechanism which is hydraulically operated by the ram head of the cutting, punching and stamping machine in which the stock feed movement is varied by increasing or decreasing the length of the feed motor stroke and simultaneously adjusting the position of stop members engageable with a stop member mounted on the reciprocating feed carriage in such a manner as to cushion the piston of the feed motor at the end of its stroke prior to engagement of the stop members by the stop member carried by the reciprocating carriage.

Another object of the invention is to provide a feed mechanism for cutting, punching and stamping machines in which the feed mechanism is operated hydraulically by the reciprocating ram head of said machine and adapted to be governed by a uniquely arranged double-acting pump mechanism connected in driven relation with one ram head so that the stroke of the pump may be varied or adjusted.

Another object of the invention is to provide a hydraulically operated feed mechanism for cutting, punching and stamping machines in which the double-acting pump is provided with means for replenishing the motive fluid in the system so that the proper amount of fluid will be maintained in said system and extreme accuracy may be had in the feeding movement of the stock feed between the die members of said machine.

Another object of the invention is to provide a hydraulically operated feed mechanism for cutting, punching and stamping machines having an intermittent gripping device for engaging the stock and feeding the same between the die members of the machine which is positive in operation and may be adjusted to vary the gripping action on the stock being fed.

Another object of the invention is to provide a hydraulically operated automatic feed mechanism for punching, stamping and cutting presses of the type as above set forth in which a reservoir is provided in the hydraulic system for maintaining a sufficient amount of motive fluid in the hydraulic system to increase efficient operation of the feed mechanism and to provide means associated with said reservoir for placing the motive fluid in said reservoir under pressure so that the system will be completely filled during the operation of the machine and feed mechanism.

Another object of the invention is to provide an automatic hydraulically operated feed mechanism of the character set forth in which a bypass valve is arranged between the pistons of the pump and reservoir so that excess fluid in said hydraulic system will be returned to said reservoir and damage to the machine prevented from excessive pressures built up in said system.

Another object of the invention is to provide an automatic feed mechanism of the above-mentioned type in which the pump connection with the ram head can be adjusted in accordance with the stroke of the feed motor so that said pump will be regulated to supply a volume of liquid to the motor cylinder slightly greater than the volume of said cylinder.

Another object of the invention is to provide a fluid transmission system for feeding mechanisms and the like in which the fluid motor is provided with a pair of pistons arranged for adjustment relative one to the other whereby the stroke of said motor may be regulated by moving the pistons toward and away from one another and to provide means associated with the transmission system for returning excess liquid in the system to the reservoir when said pistons are adjusted for operating strokes shorter than the linear dimension of the motor cylinder.

Other objects and advantages of the invention will become apparent during the course of the following description of the accompanying drawings, wherein:

Figure 1 is a top elevational view of the intermittent feed mechanism for cutting, punching and stamping machines showing the arrangement of the various parts;

Figure 2 is a longitudinal cross-sectional view taken on line 2—2 of Figure 1 looking in the direction of the arrows to illustrate in detail the various features of the intermittent feeding mechanism and the manner in which the stroke of the motor piston may be varied simultaneously with the adjustment of the stop members;

Figure 3 is an end elevational view of the feeding mechanism for cutting, punching and stamping machines, illustrating the manner in which a piece of strip stock is guided thereon, and the gearing for adjusting the stroke of the motor piston and stop members;

Figure 4 is a longitudinal cross-sectional view taken on line 4—4 in Figure 2 looking in the direction of the arrows to illustrate various details of construction of the feed carriage and gripping device as well as the manner in which fluid is admitted to the opposite ends of the motor cylinder;

Figure 5 is an end elevational view of the intermittent feed mechanism showing the adjustable actuator arm for the hydraulic pump which is adapted to be connected to a reciprocating ram head of the cutting, punching and stamping machine;

Figure 6 is a vertical cross-sectional view taken on line 6—6 of Figure 2 looking in the direction of the arrows and showing in detail the various features embodied in the pump structure for the hydraulic system;

Figure 7 is a horizontal cross-sectional view taken on line 7—7 in Figure 6 looking in the direction of the arrows and showing one of the by-pass valves as associated with the reservoir of the pump;

Figure 8 is a vertical cross-sectional view taken on line 8—8 of Figure 2 looking in the direction of the arrows and further illustrating in detail the construction and arrangement of the stock gripping member for gripping the strip stock and advancing the same forwardly beneath the die members of the cutting, punching and stamping machine;

Figure 9 is a vertical cross-sectional view taken on line 9—9 of Figure 2 looking in the direction of the arrows and showing the manner in which the stock gripping carriage is slidably mounted by the frame of the feed mechanism as well as the manner in which one of the stop members may be locked in frictional engagement with the adjusting screw therefor;

Figure 10 is a vertical cross-sectional view taken on line 10—10 of Figure 2 looking in the direction of the arrows to illustrate the stock gripping roller for preventing retrograde movement of the stock upon the return stroke of the stock feeding and gripping carriage;

Figure 11 is a fragmentary cross-sectional view taken on line 11—11 of Figure 10 showing one of the frictional gripping clutch members associated with the gripping roll for permitting forward feeding of the stock and locking the stock upon return movement of the gripping carriage;

Figure 12 is an enlarged fragmentary cross-sectional view of the piston structure and stop adjusting screw for the motor structure;

Figure 13 is a longitudinal cross-sectional view similar to Figure 2 showing the manner in which the piston stroke may be adjusted for a fluid motor and the manner in which the stop members may be adjusted between the carriage and adjusting screw;

Figure 14 is a front elevational view of the feed mechanism embodying the invention, illustrating the same attached to a reciprocating ram head type punching, cutting and stamping machine for feeding strip stock between the die members thereof;

Figure 15 is a vertical cross-sectional view taken on the irregular line 15—15 in Figure 14, showing the manner in which the ram is drivingly connected to the actuator pump and the manner in which the stroke of said pump may be adjusted;

Figure 16 is a fragmentary cross-sectional view of a modified form of the invention showing a slightly different pump construction for the hydraulic system.

*Detailed description of the invention shown in Figures 1 to 15 inc.*

In the drawings, attention is first directed to Figure 14 wherein there is shown a punching, stamping and cutting press including a bolster platform 5, reciprocating ram 6 and ram guide frame 7. Die members 8 and 9 are secured to the bolster platform 5 and ram head 6 in the usual manner so that material fed therebetween will be cut, stamped or punched by said die members.

The invention embodies an automatic intermittent feeding mechanism for feeding stock between said die members 8 and 9 and includes a base 10 having opposed flange portions 11 adapted to be bolted to the bolster platform 5 by means of bolts or the like 12 which extend through apertures 13 in said flanges 11 and have their ends threaded in suitable openings in the top surface of the bolster platform 5.

Formed integral with the base 10 is a casting which includes vertical wall members 14 which are spaced a sufficient distance apart to provide a passageway 15 for permitting the advancement of the stock therebetween (Figures 5 and 6). The passageway 15 is reduced to provide vertical wall portions 16 having V-shaped guideways 17 for receiving a feed carriage 18. Guide ribs 19 are formed on the longitudinal edges of the feed carriage for reception in the V-shaped guideways 17.

The side wall portions 14 terminate at one end in an integral casting providing a cylinder 20 having cylinder caps 21 and 22 fastened to the ends thereof by means of screws or other fastening elements and the cylinder cap 21 is provided with a slide bearing portion 23 for slidably receiving a reciprocating plunger rod 24, one end of which is enlarged as at 25 and is shaped to form a piston 26 having a suitable packing as at 27. The opposite end of the reciprocating plunger rod 24 is provided with an enlarged portion 28 and is adapted to project into a longitudinal bore 29 in the stock feeding carriage 18 in such a manner as to permit relative movement therebetween by a slight amount. The extreme free end of the reciprocating plunger rod 24 is threaded and is provided with a washer 30 on a reduced portion thereof so that a nut 31 will hold the washer against the shoulder of the reciprocating plunger rod and provide an abutment member during the return motion of the reciprocating plunger rod 24 and stock feed carriage 18.

The stock feed carriage 18 is chambered as at 32 for receiving a gripping dog 33 which is pivotally mounted upon a pivot pin 34 in such a manner as to permit the stock gripping dog 33 to rock about the pivot pin 34 and force the knife-like edge 35 carried thereby into engagement with the stock S during the forward movement of the plunger rod 24 and feeding carriage 18. The upper portion of the feeding carriage 18 is widened as at 36 and is provided with vertical wall portions 37 between which is mounted a top wall member 38 which is held in place by suitable screws or the like. The front and rear edges of the cover member 38 are spaced a slight distance from the top wall of the feed carriage to provide passageways 39 and 40 respectively for the passage of stock S. The undersurface of the top wall 38 is inclined as at 41 for slidably receiving a gripping block 43 having laterally extending tongues 44 for being received in grooves 45. A limiting stop 46 extends upwardly from the gripping block 43 and operates in a slot 47 of the top wall member 38 so as to limit the stop against movement. An adjusting screw 48 is in a suitable opening in the rear portion of the cover member 38 and has its inner end threaded into the adjustable gripping block 43 so that said block may be adjusted to any desired position and held therein by means of a lock nut 49. It will thus be seen that the gripping block may be adjusted to any desired position so as to regulate the space between the lower surface thereof as at 50 relative to the stop and the knife-like edge 35 of the stock-gripping dog 33.

The reciprocating plunger 24 is provided with a transverse opening 51 for receiving the head 52 of the pivoted gripping dog 33 so that forward movement of the reciprocating plunger 24 will cause the gripping dog to be shifted into engagement with the stock until the enlarged portion 28 on the plunger rod engages the feed carriage 18. On the return stroke, the knife-like edge 35 of the gripping dog 33 is retracted and the washer 30 abuts the feed carriage 18 after a slight movement between the carriage and plunger and thereby retracts said carriage to its starting position.

A portion of the reciprocating plunger rod 24 is of tubular construction having a bore extending inwardly from the piston end 27 for receiving a threaded tubular extension 54 formed on an adjustable piston 55. The tubular extension 54 passes through a nut member 56 mounted in the piston 26 so that rotation of the piston 55 relative to the piston 26 will cause the piston to be separated as shown in Figure 13. The piston cap 22 is provided with a bearing opening 57 through which extends a rotary shaft 58 so that the shaft will project through an opening 59 in the piston 55 and extend into the tubular threaded portion 54 of the piston 55 (Figure 12). Formed on the rotary shaft 58 is a longitudinal keyway 60 for receiving a gib or key 61 anchored in the piston 55 so as to permit relative sliding movement between the piston 55 and rotary shaft 58, but yet prevent relative rotational movement. A collar 62 is keyed to the rotary shaft 58 by means of a transversely extending key 63 so as to rotate with said shaft and provide a stop member therefor to prevent endwise movement of said shaft during the adjustment of the pistons 26 and 55 relative to one another. Affixed to the free end of the shaft 58 is the hub 64 of a gear wheel 65 which is adapted to mesh with a gear wheel 66 having its hub 67 affixed to a shaft 68 journaled in a suitable bearing opening 69 in the cylinder cap 22 and arranged so as to pass through a depending boss 70 formed integral with the cylinder 20. The shaft 68 is slightly enlarged and provided with a screw-threaded portion 71 which terminates in a bearing portion 72 which extends through a bearing opening in a depending boss 73 formed integral with the other end of the cylinder 20. The shaft 68 is provided with an enlarged threaded portion 74 slightly greater in diameter than the portion 71 and said threaded portion terminates in a reduced bearing portion 75 journaled in a cross arm 76 extending between the side walls of the base and affixed thereto by screws or the like as at 77.

It will thus be seen that rotation of the shaft 58 may be accomplished by applying a crank or the like to the polygonal-shaped end 77 of the shaft 68, and upon rotation of said shaft, the screw-threaded portions 71 and 74 will be rotated as will also the shaft 58 so as to feed the piston 26 along the tubular portion 54 thereof. In this manner the pistons 26 and 55 may be adjusted or separated a predetermined distance to produce the desired length of feed stroke.

Slidably mounted beneath the piston casting 20 is an indicator bracket 78 having an enlarged end portion provided with a threaded bore for being threadedly received upon a screw shaft 71. The indicator bracket 78 slidably engages the flattened portion of the underside of the cylinder casting 20 to prevent rotation thereof and said indicator arm 78 is adapted to travel, in unison with the piston 26 when the shaft 68 is manually rotated. Similarly, a stop nut 79 is provided with a threaded bore and is threadedly received on the threaded enlarged portion 74 of the shaft 68 so as to likewise travel along in unison with the piston 26 and indicator bracket 78 when the shaft 68 is rotated. During the forward travel of the feed carriage 18, a stop projection 79' on the underside thereof is adapted to engage the cross arm 76 so as to limit the forward feeding movement of said feed carriage and upon the return stroke of said carriage, the depending stop projection 79' will engage the stop nut 79.

The stop nut 79 is provided with a pair of guide ribs 79" which are slidably mounted in suitable ways in the vertical walls 14 arranged in opposed relation. The stop nut 79 is split inwardly from one end thereof and extending diametrically of the threaded opening therein so as to facilitate clamping of said nut upon the threaded portion 74 of the rotary shaft when a rotary locking knob 79''' is rotated into clamping engagement with one of the guide ribs 79" by a manual control lever shown in dotted lines. The rotary locking rod 79''' is provided with a flattened portion exposed to the guide ribs 79" so that rotation of the rod will clampingly engage the underside of said guide ribs 79" and thereby lock the lock nut 79 to the base or casting as well as to the screw-threaded shaft 74. During the return movement of the feed carriage 18 the stop nut 79 is engaged by the stop projection 79' on the feed carriage which, as stated above, is adjusted to any desired position to produce the required feed carriage stroke by rotating the shaft 68.

In order to cushion the pistons 26 and 55 as well as the reciprocating plunger rod 24 against shock, the cylinder cap 21 is provided with an enlarged bore 80 for receiving an enlarged portion 25 of the piston 26 so as to trap a slight amount of fluid therein which is allowed to return to the cylinder chamber 20 through a radially extending bore 81 and bleed duct 82 having communication therewith. The passageway between the radially extending bore 81 and bleed duct 82 may be controlled by a screw-threaded plug 83 having an end portion 84 which projects into said bore 81 and restricts the passageway between said bore and bleed duct 82. Similarly, the piston cap 22 is provided with an enlarged bore 85 for receiving the enlarged tubular portion 86 on the piston 55. A radial bore 87 communicates with the enlarged bore 85 and permits the fluid trapped in said enlarged bore to bleed back to the piston cylinder through a bleed port 88. A control screw 89 is threaded in the radially extending bore 87 and is provided with a projection 90 for restricting the fluid passageway between said bore and bleed duct 88 in substantially the same manner as pointed out and described in connection with the adjustable threaded plug 83.

Extending transversely of the cylinder casting 20 is a guideway 91 for receiving a pair of slides 92 arranged in opposed relation and spaced apart so that guide rollers 93 may be rotatably mounted on said slides 92 by means of headed pivot pins or bolts 94. Locking screws 95 are threaded in wing extensions 96 of said guide or way 91 to engage the underside of the slide 92 and thereby hold said slide in a predetermined adjusted position.

Formed on the top wall of the casting 20 forwardly of the transversely extending slideway 91 is a transversely extending platform 97 the ends of which extend beyond said cylinder and the top wall 98 of said platform is substantially flat to provide a rest or support for the strip stock S being fed between the die members of the punching, stamping and cutting machine. Formed integral with the platform 97 at the ends thereof is a pair of oppositely disposed upstanding lug projections 99 to which is pivotally attached an adjustable roller housing 100. The roller housing is provided with a hinge extension 101 which is mounted between the upstanding lugs 99 and is fastened thereto to swing about a hinge pintle 102. Side walls 103 are formed on the roller housing 100 and are provided with bearing bosses 104 for receiving a shaft 105. The shaft may be locked in position by transversely extending locking keys 106 and rotatably mounted on the shaft 105 is a stock engaging gripping roller 107 by means of anti-friction bearing members 108 at each end thereof to permit free unidirectional movement of said roller in the direction of stock movement. The ends of the cylinder or roller 107 are closed by screw-threaded plugs 109 and mounted between the anti-friction bearing 108 and threaded plug 109 at one end of the roller is a roller clutch to prevent rotation of the roller 107 in a direction opposite the direction of stock feed movement. The roller clutch includes a ratchet shaped wheel 110 keyed to the shaft 105 by means of a gib or key 111 to remain stationary, and a series of balls 112 are interposed between the teeth 113 of the ratchet wheel 110 and the inner periphery of the roller 107 so as to frictionally engage said inner peripheral surface and prevent rotation of the roller 107 in a direction opposite the direction of stock feed movement. The roller housing 100 and roller 107 are adapted to be yieldingly urged into engagement with the stock S by means of an adjusting bolt 114 which is threadedly mounted in a yoke member 115 integrated with the piston casting 20 and arranged so as to engage a projection 116 carried by the housing 100 and extending beneath the cross arm of said yoke member 115. A coil spring 117 is received in a recess formed in the projection 116 and has one of its ends abutting the floor of the recess and the opposite end engaged by the adjusting bolt 114 so that rotation of the adjusting nut will increase or decrease the tension on the spring and similarly increase or decrease the pressure on the friction-gripping roller 107. A lock nut 118 is mounted on the adjusting bolt 114 to maintain the same in an adjusted position.

In order to determine the amount of adjustment imparted to the stop nut 79, an extension arm 119 is formed on the indicator bracket 78 which has an upstanding indicator pointer 120 affixed thereto by a screw or the like 121, and said indicator pointer is adapted to register with graduations on an indicator scale bar 122 which has its ends affixed to the cylinder casting 20 by screws or the like 123 at each end thereof.

Extending between the upper portions of the side walls 14 and formed integral therewith is a cylinder casting 124 to provide a cylinder chamber 125 in which is mounted for reciprocation a pair of differential valved pistons 126 and 127. Formed integral with the cylinder casting 124 is a reservoir housing 128 for providing a reservoir chamber 129 which has communication with the cylinder chamber 125 through an opening slot 130. The pistons 126 and 127 are hollow and provided with piston ports 131 and 132 respectively which are adapted to be controlled by a double-ended valve member 133 having seating portions 134 and 135 adapted to alternately seat and close the ports 131 and 132. The double-ended valve member 133 is provided with a central reduced portion 136 forming enlarged shoulder portions 137 and 138 which are adapted to engage slide guides 139 and 140 mounted in the hollow pistons 126 and 127 respectively. Slight movement of the double-ended valve member 133 is thus permitted before the ports 131 and 132 are closed on the return stroke of the piston, and similarly, slight movement of the double-ended valve member 133 is provided for when the pistons are moved in the opposite direction. That is to say, when the piston 126 is being returned from the end of the cylinder shown in Figure 6 to the opposite end of the cylinder chamber 125, the shoulder formed by the enlarged portion 137 on the double-ended valve member 133 will engage the slide guide 139 and move the piston after the port 131 has been opened. A similar operation occurs with respect to the piston 127.

Formed intermediate the ends of the double-ended valve member 133 is a transverse slot 141 which is adapted to receive the free end of the oscillating crank arm 142 having its hub portion 143 mounted on a rock-shaft 144. The ends of the rock shaft 144 are journaled in suitable bearing openings 145 in tubular bearing bosses 146 formed integral with the reservoir housing 128. One of the tubular bearing bosses 146 is provided with a threaded opening 147 for receiving the screw-threaded end of a fitting 148 having an enlarged bore 149 arranged so as to establish communication between a dash pot structure 150 and the reservoir chamber through a duct 151.

Reciprocably mounted in the dash pot 150 is a piston 152 having a plunger rod 153 extending through the dash pot and provided on its outer end with a manual control rod 154. A coil spring 155 is housed in the dash pot 150 to load the plunger 152 and thereby place the reservoir chamber under a predetermined pressure load.

Mounted on the other end of the rock shaft 144 and keyed thereto is a collar 156 which is provided with a hub portion 157 having arm extensions 158 and 159 arranged as shown in Figure 5. The free ends of the arm extensions 158 and 159 are provided with threaded bosses 160 and 161 respectively for receiving adjustable screw members 162 and 163 respectively, the ends of which are adapted to be engaged by a lever arm 164 which has its hub portion 165 received on the collar 156 to rotate freely thereon. The hub portion 165 is retained in position by a keeper plate 167 held in place by a retaining bolt 168 threaded in a suitable opening in the end of the rock shaft 144. The free end of the lever arm 164 is provided with a pair of parallel flanged portions 168' at each side thereof for slidably receiving a slide block 169 which carries a pin 170 (Figure 1) which is adapted to be slidably mounted in a slot 171' in the end of said oscillating lever 164. One end of the pin 170 is reduced as at 171 for receiving a retaining nut 172 and thereby lock the pin 170 in the longitudinal slot 171'. The opposite end of the pin 170 is enlarged to provide a bearing surface for receiving a roller 173 which is adapted to be held in place upon the pin 170 by a retaining plate 174 held in place by a retaining bolt 175. An indicator pointer 164' is attached to the lever arm 164 and is arranged so that the end thereof will register with a graduated scale 128' to facilitate adjustment of said arm 164 in accordance with the stroke of the motor pistons 26 and 55 desired.

Mounted on the ram head 6 is an angle bracket having a base portion 176 held in place by machine screws or the like 177, and said angle bracket is provided with an offset portion 178 having a slot 179 for receiving the roller 173 (Figure 15). Thus it will be seen that reciprocation of the ram head 6 will oscillate the lever arm 164 and impart corresponding oscillation to the piston arm 142 to cause the pistons 126 and 127 to move from one end of the cylinder chamber to the other in accordance with the reciprocating movement of the ram head.

In order to hydraulically transmit the movement of the pistons 126 and 127 to the pistons 26 and 55 in the cylinder casting 20, the side walls 14 of the base 10 are cut away as at 180 and 181 to provide ports having communication with the opposite ends of the cylinder chamber 125 and with feed ducts 182 and 183 extending longitudinally of the base 10. The feed duct 182 terminates in the base casting 10 at one end in a laterally extending portion 184 which has communication with the left-hand end of the cylinder casting 20 as shown in Figure 4. The other feed duct 183 terminates at the other end of the cylinder casting 20 in a laterally extending passageway 185 (Figure 4). The laterally extending passageway 185 is connected to the feed duct or passageway 183 by means of a longitudinally extending pasageway 186 formed in an integral portion 187 of the cylinder casting 20.

Closure plates 188 and 189 are affixed to the side walls 14 by means of screws or the like as at 190 to cover the ends of the cylinder chamber 25 and likewise cover the communicating ports or ducts 180 and 181. Thus it will be seen that when the piston 126 has been moved to its full stroke from the right hand end of the cylinder chamber 25 to the left-hand end, fluid under pressure will pass through the port 180, communicating duct 182 and to one end of the cylinder casting 20 through the port 184, and return the plunger rod 24 to the position shown in Figure 2. During this movement, fluid from the reservoir chamber 129 may pass through the opening 130 and through the open port 132 in the piston 127 to allow the right hand end of the cylinder chamber 125 to be replenished with motive fluid so that when the piston arm 142 is moved in its opposite direction with respect to that shown in Figure 6, the valve 135 will close the port 132 and force the motive fluid in the right-hand end of the chamber 125 through the duct 181, longitudinal passageways 183 and 186, and through the lateral port 185 to the opposite end of the pistons 26 and 55. The pistons will thus be moved to the opposite end of the cylinder from the position shown in Figure 4 to cause the feed carriage 18 to grip the stock S and advance the same beneath the die members of the punching, stamping and cutting machine upon the up-stroke of the ram head 6. During the down stroke of the ram head, the stock is held by the friction gripping roller 107 and the feed carriage is returned to the starting point of the feeding stroke.

Formed in enlarged bosses 192 in the reservoir housing 128 are threaded bores 193 which are adapted to receive removable tubular valve cages 194 which have their upper ends threaded and provided with polygonal portions 195 to facilitate insertion and removal of said valve cages 194. The valve cages are adapted to rest upon valve seats 196 which are received in openings 197 in enlarged boss formations 198 extending inwardly from the end walls of the reservoir casting 128 (Figure 7). Ports 199 and 200 are formed in the casting at each end of the cylinder chamber 125 to connect the cylinder chamber with the reservoir chamber 129 through the valve seat openings 201. Slidably mounted in each of the valve cages 194 is a valve plug 202 which has an enlarged portion 203 provided with longitudinally extending grooves 204 on the peripheral surface thereof for permitting passage of fluid from the cylinder chamber 125 to the reservoir chamber 129. Coil springs 205 are mounted in the valve cages 194 for urging the beveled portions of the valve plugs 202 upon their seat members 196 and each of the valve cages is provided with an opening 206 having communication with a reservoir chamber 129. Retaining rings 207 are mounted in the lowermost ends of the valve cages 194 to prevent displacement of the valve plugs 202 when the valve cages are removed from their threaded openings 193.

The coil springs 205 are of sufficient tension to yieldingly hold the valve plugs 202 seated without permitting by-passing of the liquid throughout the entire stroke of the pistons 126 and 127 to thereby operate the pistons 26 and 55 until said last-named pistons reach the end of their stroke and are stopped by the cross arm 76 or stop nut 79 being engaged by the stop projection 79' on the feed carriage 18. After the feed carriage has stopped, excess motive fluid in the cylinder chamber 125 is returned to the reservoir chamber 129 through the by-pass valve 202. In this manner the proper volume of operating fluid is insured for each stroke of the pistons 126 and 127 so that the pistons 26 and 55 will be operated and caused to travel the exact distance required for a particular stamping, cutting or punching operation.

A removable cover cap 208 is provided for the reservoir casting 128 to facilitate replenishing the operating fluid in the reservoir chamber 129, and after the reservoir chamber has been filled with the plunger 152 retracted against the action of the coil spring 155 by holding the hand knob 154 manually, the closure member 208 may be replaced and the hand knob 154 released so as to place the operating fluid in the reservoir chamber under a predetermined pressure. This pressure is relatively slight in proportion to the operating pressure produced by movement of the pistons 126 and 127 and does not affect the pistons 26 and 55. Thus the pistons 126 and 127 in the cylinder chamber 125 act as a pump to supply pressure fluid to operate the motor consisting of the pistons 26 and 55 in the cylinder chamber 25.

*Modified form of the invention shown in Figure 16*

In the modified form of the invention shown in Figure 16, the side walls 14a of the feed mechanism casting are connected by a cylindrical casting 124a to provide a cylinder chamber 125a in which are reciprocably mounted valved pistons 126a and 127a. Formed in the end walls of the pistons are opposed valve ports 131a and 132a which are adapted to be alternately opened and closed by a double-ended valve member 136a. The valve member 136a is provided with reduced end portions 137a and 138a which are slidably received in perforated guide discs 139a and 140a. The ends of the double-ended valve member 136a are provided with valve plugs 134a and 135a which are adapted to seat in beveled portions of the valve ports 131a and 132a. The reduced portions 137a and 138a of the double-ended valve member are threaded as at 209 for receiving stop nuts 210. The oscillating lever arm 142a is adapted to rock with the shaft 144a as pointed out in connection with the form of the invention shown in Figures 1 to 15 inclusive and in doing so, it causes the double-ended valve member 136a to be reciprocated within the valve chamber 125a to thereby oscillate the pistons 126a and 127a as well as controlling the opening and closing of the valve plugs 134a and 135a. The side walls 14a of the base casting are provided with grooves 180a and 181a similar to the grooves 180 and 181 connecting the ends of the cylinder chamber 125a with the ports or ducts 182 and 183 for operation of the motor pistons 26 and 55. Closure plates 188a and 189a are secured to the side walls 14a to close the ends of the cylinder chamber 125a and also close the grooves 180a and 181a. The reservoir chamber 129a is adapted to be alternately connected with the cylinder chamber 125a upon the opening of the valve plugs 134a and 135a through a slot 130a in the cylinder wall 124a and the oscillating lever 142a is received in a transversely extending slot 141a in substantially the same manner as pointed out in connection with the oscillating arm 142 and double-ended valve member 136 in the form of the invention shown in Figures 1 to 15 inclusive. By-pass ports 199a and 200a connect the opposite ends of the cylinder chamber 125a with the reservoir chamber 129a by means of yieldingly seated valve members similar to those described in connection with the form of the invention shown in Figures 1 to 15 inclusive to permit excess operating fluid to be returned to the reservoir chamber and thereby maintain the proper amount of operating fluid in the system.

It is to be noted that the reduced portion 137a is slightly longer than the reduced portion 138a so as to permit a greater movement of the double-ended valve member before the piston 126a is retracted or returned to the starting position of its pressure stroke, while only a slight movement of the double-ended valve member 136a is necessary before the piston 127a is retracted or moved to the starting position of its pressure stroke. This structure produces the same effect as the differential piston structure shown in connection with the form of the invention in Figures 1 to 15 inclusive and allows the piston 126a to move through a relatively short stroke but yet impart a stroke to the piston 127a substantially equal to the entire movement of the double-ended valve member 136a. In other words, the feed stroke of the piston 127a will communicate with the right-hand end of the cylinder casting 20 (Figures 1 to 15) so that the pistons 26 and 55 therein will be forced to the left hand end of the cylinder casting 20 during the stock feed movement of the gripping carriage 18, whereas during the pressure stroke of the piston 126a to return the carriage 18 to the beginning of its feed stroke, said piston 126a will travel through a short distance in the cylinder 124a a sufficient amount to return the pistons 26 and 55 to a position similar to that shown in Figure 4 in the form of the invention shown in Figures 1 to 15 inclusive. The piston 126a is shown in Figure 16 as being at the end of the stroke wherein the feed carriage will be returned to its starting position for feeding stock between the die members of the punching, stamping and cutting machine. The piston 127a is shown in a position in which movement of the double-ended valve member 136a will close the port 132a and move the piston 127a to the right and force fluid under pressure through the groove 181a and through the passageways 183 and 186 (Figure 4) to the right hand end of the cylinder 20 and thereby force the pistons 26 and 55 to the left as well as the feed carriage 18. Thus the pistons 126a and 127a in the cylinder chamber 125a act as a pump to supply pressure fluid to operate the motor consisting of the pistons 26 and 55 in the cylinder chamber 25.

*Operation of the form of invention shown in Figures 1 to 15 inclusive*

In operation it will be assumed that the casting 10 is attached to the bolster platform of the punch press as shown in Figure 14 and the stock S has been threaded in place between the edge guiding rollers 93, friction gripping roller 197 and through the slotted openings 39 and 40 in the feed carriage 18 so that one end of the stock will be presented between the die members 8 and 9 (Figure 14).

A crank arm or other tool is applied to the polygonal end 77 of the rotary shaft 68 so as to adjust the pistons 26 and 55 to the required length of stroke and position the stop member 79 along the threaded rod 74 to stop the motion of the feed carriage 18 during its return travel. By reference to the graduated strip 121 and pointer arm 120, the required feed motion of the feed carriage may be determined and the pistons and stop member 79 adjusted so as to cause the stock S to be advanced a predetermined distance.

After the pistons 26 and 55 have thus been adjusted as well as the stop nut 79, the punching, stamping and cutting machine is set in operation so as to cause reciprocation of the ram head 6. Upon reciprocation of the ram head, the oscillating piston arm 142 is moved to and fro to cause the pistons 126 and 127 to reciprocate in the cylinder chamber 125. As shown in Figure 6, the piston 26 is in its starting position for placing the fluid under pressure in the right hand end of the cylinder chamber 25 so as to force fluid under pressure through the grooves 181, passageways 183 and 186 (Figure 4) to the right hand end of the cylinder casting 20. The pistons are advanced in the cylinder 20 to cause the slidable feed carriage 18 to move in a direction of stock feed and during the initial movement of the pistons 26 and 55, the plunger rod 24 is permitted to slide a slight amount relative to the sliding feed carriage and thereby rock the gripping dog on a pivot pin 34 so that the knife-like edge thereof 35 will engage the underside of the stock and tightly grip the same. When the enlarged portion 28 on the plunger rod has engaged the slidable feed carriage 18 upon continued movement of the plunger rod 24, said slidable feed carriage 18 is moved to the left from the position shown in Figure 2 to advance the stock S beneath the die members 8 and 9. The above movement takes place during the upstroke of the ram head during its reciprocation and during the down stroke thereof the pistons 126 and 127 are moved to the left-hand end of the cylinder chamber 125 or to the position shown in Figure 6 so as to force fluid under pressure through the groove 180, longitudinal passageway 182 and laterally extending port 184 to the left hand end of the cylinder 20. As this occurs, the plunger rod 24 is retracted and the pistons 26 and 55 thereon are returned to the right-hand end of the cylinder 20 or to the position shown in Figure 4. At each end of the stroke of the plunger rod 24 the pistons are cushioned by means of the enlarged portions 25 and tubular portions 86 thereon which enter the annular chambers 80 and 85 respectively. During the return stroke of the plunger rod 24 just described, said plunger rod is shifted to the right a slight amount before the washer 30 engages the slidable feed carriage 18 so as to rock the gripping dog 33 on its pivot pin 34 and retract the knife-like edge thereof 35 from engagement with the stock S. Upon continued return movement of the plunger rod 24, the feed carriage is returned to its initial position and the stock is gripped by the friction roller 107 so as to prevent retrograde movement of the stock. With the slidable feed carriage returned to the position shown in Figure 2, the mechanism is arranged for the next feeding operation of the stock S. In the event that excess operating fluid is present in either side of the system, it is by-passed to the reservoir chamber 129 as explained in connection with the description of the by-pass valve 202, and upon the return stroke of the pistons 126 and 127, the valve plugs 134 and 135 are unseated from their ports 131 and 132 so as to permit operating fluid to pass from the reservoir chamber and through the perforated guide rings 139 and 140 to the opposite sides of the pistons. Upon the beginning of the pressure stroke, the valves 134 and 135 are closed and trap the operating fluid in the cylinder 125. Thus, the cylinder chamber will be completely filled with operating fluid at the beginning of the stroke to insure the movement of the pistons 26 and 55 through their complete stroke and after the carriage 18 has been stopped by the bridge member 76 and stop member 79, continued movement of the pistons 126 and 127 causes the excess liquid to be returned to the reservoir chamber 129 through the by-pass valves 202.

When the adjustable gripping block 43 has become worn, the adjusting screw 48 may be rotated to slide the block along the ways 45 and compensate for the wear between the under sides of the block 43 and the stock S.

The yielding spring tension on the friction gripping roller 107 may be regulated by adjusting the adjusting bolt 114 so as to exert the proper pressure on the stock S so as to grip the same and prevent retrograde movement of the stock during the return travel of the slidable feed carriage 18. By manipulating the hand screw 95, the stock edge engaging rollers 93 may be moved toward or away from one another to accommodate strip stock of various widths within the range of the width of the friction gripping roller 107.

If it is desired to vary the play between the arm extension 164 and oscillating piston lever 142, the adjusting screws 162 and 163 are manipulated so that the arm extension 164 will move a predetermined amount before imparting motion to the oscillating piston lever 142. In this manner, the oscillating arm projection 164 may be adjusted so as to permit reciprocation of the ram 6 a predetermined distance before the arm extension 164 engages one of the adjusting screws 162 and 163 and transmits reciprocating motion of the ram head 6 to the oscillating piston-operating lever through the rock shaft 144.

The screw plugs 83 and 89 may be adjusted so as to provide the proper cushioning effect of the pistons 26 and 55 as they reach the end of their piston travel and by operating the rotary shaft 68, the pistons 26 and 55 may be separated and be cushioned prior to the engagement of the stop projection 79' on the slidable reciprocating feed carriage 18 by the cross arm 76 and stop nut 79. Obviously, the shaft 68 may be rotated and adjusted to produce a high degree of precision movement of the stock S in order to obtain the maximum number of stampings or the like from the length of the strip stock S.

The system may be replenished from time to time by filling the reservoir after the dash pot piston 152 has been retracted and other adjustments have been made to the feeding mechanism so as to facilitate a nicety of control over the feed movement of the stock such as the adjustment of the pin 170 in the slot 171' to cause the pistons 126 and 127 to move through increased or decreased piston strokes in proportion to the reciprocating movement of the punching, stamping and cutting machine ram 6.

*Operation of the form of the invention shown in Figure 16*

When the pump piston structure shown in Figure 16 is substituted for that shown in Figures 1 to 15 inclusive, the operation is substantially the same and the slidable feed carriage 18 is moved to and fro so as to grip and feed the stock beneath the die members 8 and 9 of the punching, stamping and cutting machine. The only difference is greater movement of the piston 126a to insure proper fluid pressure during the feed stroke of the slidable feed carriage without employing differential pistons as shown in connection with the form shown in Figures 1 to 15 inclusive. At the end of each piston stroke 126a and 127a, excess operating fluid is returned to the reservoir chamber 129a through the by-pass ports 199a and 200a and through by-pass valves similar to the valves 202. The alternate opening and closing of the valves 134a and 135a at the beginning and end of the stroke of the pistons 126a and 127a occurs in substantially the same manner as pointed out in connection with the double-ended valve 136 (Figures 1 to 15 inclusive.)

It is to be understood that the forms of the invention herewith shown and described are to be taken as specific embodiments of the same and that various changes may be made in the shape, size and arrangement of parts without departing from the spirit of the invention or the scope of the appended claims.

What I claim is:

1. A feed mechanism for punching, stamping and cutting machines having a platform and a reciprocating ram head, a support affixed to said platform, a pump carried by said support having a double-acting piston connected to said ram head in driven relationship therewith, a reciprocating stock feeding device slidably mounted on said support, a motor carried by said support having a pair of adjustable pistons drivingly connected to said reciprocating stock feeding device, means for adjusting said pistons to regulate the stroke of said reciprocating member, and stop means engageable with said reciprocating stock feeding device to limit the stroke of said feeding device.

2. A feed mechanism for punching, stamping and cutting machines having a platform and a reciprocating ram head, a support affixed to said platform, a pump carried by said support having a double-acting piston connected to said ram head in driven relationship therewith, a reciprocating stock feeding device slidably mounted on said support, a motor carried by said support having a pair of adjustable pistons drivingly connected to said reciprocating stock feeding device, means for adjusting said pistons to regulate the stroke of said reciprocating member, and stop means engageable with said reciprocating stock feeding device to limit the stroke of said feeding device, said piston adjusting means and stop means being operably connected to move in unison.

3. A feed mechanism for punching, stamping and cutting machines having a platform and a reciprocating ram head, a support affixed to said platform, a pump carried by said support having a double-acting piston connected to said ram head in driven relationship therewith, a reciprocating stock feeding device slidably mounted on said support, a motor carried by said support having a pair of adjustable pistons drivingly connected to said reciprocating stock feeding device, means for adjusting said pistons to regulate the stroke of said reciprocating member, and stop means engageable with said reciprocating stock feeding device to limit the stroke of said feeding device, said pump being hydraulically connected with said motor and provided with a reservoir chamber for replenishing the motive fluid in said system.

4. A feed mechanism for punching, stamping and cutting machines having a platform and a reciprocating ram head, a support affixed to said platform, a pump carried by said support having a double-acting piston connected to said ram head in driven relationship therewith, a reciprocating stock feeding device slidably mounted on said support, a motor carried by said support having a pair of adjustable pistons drivingly connected to said reciprocating stock feeding device, means for adjusting said pistons to regulate the stroke of said reciprocating member, stop means engageable with said reciprocating stock feeding device to limit the stroke of said feeding device, said pump being hydraulically connected with said motor and provided with a reservoir chamber for replenishing the motive fluid in said system, and by-pass means between the cylinder chamber of said pump and said reservoir chamber for returning excess motive fluid thereto.

5. A feed mechanism for punching, stamping and cutting machines having a platform and a reciprocating ram head, a support affixed to said platform, a pump carried by said support having a double-acting piston connected to said ram head in driven relationship therewith, a reciprocating stock feeding device slidably mounted on said support, a motor carried by said support having a pair of adjustable pistons drivingly connected to said reciprocating stock feeding device, means for adjusting said pistons to regulate the stroke of said reciprocating member, stop means engageable with said reciprocating stock feeding device to limit the stroke of said feeding device, and means for cushioning the adjustable pistons at the end of their stroke.

6. A feed mechanism for punching, stamping and cutting machines having a platform and a reciprocating head, a base adapted to be affixed to the platform, pump means carried by the base and operatively connected to the reciprocating head, a reciprocating member carried by the base for feeding stock between the platform and head, a motor mounted on the base controlled by said pump means and drivingly connected to the reciprocating member, means for adjusting the stock of said reciprocating member, and means for cushioning the reciprocating member at the end of its reciprocating stroke.

7. A feed mechanism for punching, stamping and cutting machines having a platform and a reciprocating head, a base adapted to be affixed to the platform, pump means carried by the base and operatively connected to the reciprocating head, a reciprocating member carried by the base for feeding stock between the platform and head, a motor mounted on the base controlled by said pump means and drivingly connected to the reciprocating member, means for adjusting the stock of said reciprocating member, and means for hydraulically connecting said pump means with said motor and including a reservoir chamber for replenishing the motive fluid in said system whereby said system will be completely filled during operation of said feeding mechanism.

8. A feed mechanism for punching, stamping and cutting machines having a platform and a reciprocating ram head, a support affixed to said platform, a pump carried by said support having a double-acting piston connected to said ram head in driven relationship therewith, a reciprocating stock feeding device slidably mounted on said support, a motor carried by said support having a pair of adjustable pistons drivingly connected to said reciprocating stock feeding device, means for adjusting said pistons to regulate the stroke of said reciprocating member, stop means engageable with said reciprocating stock feeding device to limit the stroke of said feeding device, and a screw shaft for operably connecting said piston adjusting means with said stop means whereby one of said adjustable pistons and stop means will be operated simultaneously.

9. In a feed mechanism for punching, stamping and cutting machines having a bed and reciprocating member, support means mounted on said bed having a guideway for feeding stock between the bed and reciprocating member, a double-acting piston type pump mounted on said support means connected to said reciprocating member, a reciprocating stock feeding member mounted on said support for frictionally engaging said stock and feeding the same forwardly, a double-acting piston type motor drivingly connected to said reciprocating stock feeding member and hydraulically connected to said pump, means for adjusting the stroke of said double-acting type motor, and means for cushioning the pistons of said motor as they reach the end of their stroke.

10. In a feed mechanism for punching, stamping and cutting machines having a bed and reciprocating member, support means mounted on said bed having a guideway for feeding stock between the bed and reciprocating member, a double-acting piston type pump mounted on said support means connected to said reciprocating member, a reciprocating stock feeding member mounted on said support for frictionally engaging said stock and feeding the same forwardly, a double-acting piston type motor drivingly connected to said reciprocating stock feeding member and hydraulically connected to said pump, said double-acting motor being provided with a pair of pistons mounted for relative movement one to the other, means for adjusting said pistons toward and away from one another, stop means for limiting the reciprocating movement of said stock feeding member, and means interconnecting the piston adjusting means and stop means whereby said stock feeding means may be adjusted to vary the feed stroke thereof.

11. In a feed mechanism for punching, stamping and cutting machines having a bed and reciprocating member, support means mounted on said bed having a guideway for feeding stock between the bed and reciprocating member, a double-acting piston type pump mounted on said support means connected to said reciprocating member, a reciprocating stock feeding member mounted on said support for frictionally engaging said stock and feeding the same forwardly, a double-acting piston type motor drivingly connected to said reciprocating stock feeding member and hydraulically connected to said pump, said double-acting motor being provided with a pair of pistons mounted for movement relative one to the other, means for adjusting said pistons toward and away from one another, stop means for limiting the reciprocating movement of said stock feeding member, means interconnecting the piston adjusting means and stop means whereby said stock feeding means may be adjusted to vary the feed stroke thereof, and means for cushioning the pistons of said double-acting motor as they approach the end of their stroke.

12. In a feed mechanism for punching, stamping and cutting machines having a bed and reciprocating member, support means mounted on said bed having a guideway for feeding stock between the bed and reciprocating member, a double-acting piston type pump mounted on said support means connected to said reciprocating member, a reciprocating stock feeding member mounted on said support for frictionally engaging said stock and feeding the same forwardly, a double-acting piston type motor drivingly connected to said reciprocating stock feeding member and hydraulically connected to said pump, means for adjusting the stroke of said double-acting type motor, and means for cushioning the pistons of said motor as they reach the end of their stroke, said double-acting piston type pump being provided with a reservoir chamber to receive excess motive fluid when the stroke of the feed mechanism is varied.

13. In a feed mechanism for punching, stamping and cutting machines having a bed and reciprocating member, support means mounted on said bed having a guideway for feeding stock between the bed and reciprocating member, a double-acting piston type pump mounted on said support means connected to said reciprocating member, a reciprocating stock feeding member mounted on said support for frictionally engaging said stock and feeding the same forwardly, a double-acting piston type motor drivingly connected to said reciprocating stock feeding member and hydraulically connected to said pump, means for adjusting the stroke of said double-acting type motor, means for cushioning the pistons of said motor as they reach the end of their stroke, said pump being provided with a reservoir chamber for replenishing the hydraulic system with motive fluid, and by-pass valve means interposed between the ends of the double-acting piston type pump and said reservoir for returning excess motive fluid to said reservoir when the stroke of said stock feeding member is varied and shortened.

14. In a feed mechanism for punching, stamping and cutting machines, having a work support and reciprocating head member, support means affixed to said work support, guide means on said support means, a reciprocating stock feeding slide mounted in said guide means, a pivoted stock gripping dog carried by said slide adapted to frictionally engage the stock and feed the same forwardly beneath said work support and reciprocating member, means carried by the support means for preventing retrograde movement of said stock during the return stroke of said slide, a pump chamber formed in said support means, a pair of pistons mounted in said chamber having valve ports therein, a double-ended valve member slidably connecting said pistons adapted to alternately open and close the ports in said pistons, means for connecting said double-acting valve member to said reciprocating head member, a double-acting motor mounted on said support means, a plunger rod extending into said motor slidably connected with the reciprocating stock feeding member and pivotally secured to said gripping dog, a piston carried by said plunger rod, a second piston connecting said pistons to permit separation thereof, port means connecting the ends of said pump chamber with the respective ends of said motor, an adjustable stop carried by said support means, and means interconnecting said stop means and second-mentioned piston to facilitate adjustment of the stroke of said reciprocating stock feeding slide.

15. In a feed mechanism for punching, stamping and cutting machines having a work support and reciprocating head member, support means affixed to said work support, guide means on said support means, a reciprocating stock feeding slide mounted in said guide means, a pivoted stock gripping dog carried by said slide adapted to frictionally engage the stock and feed the same forwardly beneath said work support and reciprocating member, means carried by the support means for preventing retrograde movement of said stock during the return stroke of said slide, a pump chamber formed in said support means, a pair of pistons mounted in said chamber having valve ports therein, a double-ended valve member slidably connecting said pistons adapted to alternately open and close the ports in said pistons, means for connecting said double-acting valve member to said reciprocating head member, a double-acting motor mounted on said support means, a plunger rod extending into said motor slidably connected with the reciprocating stock feeding member and pivotally secured to said gripping dog, a piston carried by said plunger rod, a second piston connecting said pistons to permit separation thereof, port means connecting the ends of said pump chamber with the respective ends of said motor, an adjustable stop carried by said support means; means interconnecting said stop means and second-mentioned piston to facilitate adjustment of the stroke of said reciprocating stock feeding slide, and means carried by the pistons of said motor for cushioning the shock of said reciprocating stock feeding member before being engaged by said stop means.

16. In a feed mechanism for punching, stamping and cutting machines having a work support and reciprocating head member, support means affixed to said work support, guide means on said support means, a reciprocating stock feeding slide mounted in said guide means, a pivoted stock gripping dog carried by said slide adapted to frictionally engage the stock and feed the same forwardly beneath said work support and reciprocating member, means carried by the support means for preventing retrograde movement of said stock during the return stroke of said slide, a pump chamber formed in said support means, a pair of pistons mounted in said chamber having valve ports therein, a double-ended valve member slidably connecting said pistons adapted to alternately open and close the ports in said pistons, means for connecting said double-acting valve member to said reciprocating head member, a double-acting motor mounted on said support means, a plunger rod extending into said motor slidably connected with the reciprocating stock feeding member and pivotally secured to said gripping dog, a piston carried by said plunger rod, a second piston connecting said pistons to permit separation thereof, port means connecting the ends of said pump chamber with the respective ends of said motor, an adjustable stop carried by said support means, and means interconnecting said stop means and second-mentioned piston to facilitate adjustment of the stroke of said reciprocating stock feeding slide, said pump chamber being provided with a reservoir chamber and by-pass means between said pump chamber and reservoir chamber to permit the return of excess motive fluid to said reservoir chamber when the stroke of said reciprocating stock feeding slide is adjusted.

17. In a feed mechanism for punching, stamping and cutting machines having a work support and reciprocating head member, support means affixed to said work support, guide means on said support means, a reciprocating stock feeding slide mounted in said guide means, a pivoted stock gripping dog carried by said slide adapted to frictionally engage the stock and feed the same forwardly beneath said work support and reciprocating member, means carried by the support means for preventing retrograde movement of said stock during the return stroke of said slide, a pump chamber formed in said support means, a pair of pistons mounted in said chamber having valve ports therein, a double-ended valve member slidably connecting said pistons adapted to alternately open and close the ports in said pistons, means for connecting said double-acting valve member to said reciprocating head member, a double-acting motor mounted on said support means, a plunger rod extending into said motor slidably connected with the reciprocating stock feeding member and pivotally secured to said gripping dog, a piston carried by said plunger rod, a second piston connecting said pistons to permit separation thereof, port means connecting the ends of said pump chamber with the respective ends of said motor, an adjustable stop carried by said support means, and manually operable means connecting the stop means and said second-mentioned piston to facilitate adjustment of said piston and stop means in unison.

18. In a feed mechanism for punching, stamping and cutting machines having a work support and reciprocating head member, support means affixed to said work support, guide means on said support means, a reciprocating stock feeding slide mounted in said guide means, a pivoted stock gripping dog carried by said slide adapted to frictionally engage the stock and feed the same forwardly beneath said work support and reciprocating member, means carried by the support means for preventing retrograde movement of said stock during the return stroke of said slide, a pump chamber formed in said support means, a pair of pistons mounted in said chamber having valve ports therein, a double-ended valve member slidably connecting said pistons adapted to alternately open and close the ports in said pistons, means for connecting said double-acting valve member to said reciprocating head member, a double-acting motor mounted on said support means, a plunger rod extending into said motor slidably connected with the reciprocating stock feeding member and pivotally secured to said gripping dog, a piston carried by said plunger rod, a second piston connecting said pistons to permit separation thereof, port means connecting the ends of said pump chamber with the respective ends of said motor, an adjustable stop carried by said support means, and means for indicating the linear distance the motor pistons and stop means have been adjusted.

19. In a feed mechanism for punching, stamping and cutting machines having a work support and reciprocating head member, support means affixed to said work support, guide means on said support means, a reciprocating stock feeding slide mounted in said guide means, a pivoted stock gripping dog carried by said slide adapted to frictionally engage the stock and feed the same forwardly beneath said work support and reciprocating member, means carried by the support means for preventing retrograde movement of said stock during the return stroke of said slide, a pump chamber formed in said support means, a pair of pistons mounted in said chamber having valve ports therein, a double-ended valve member slidably connecting said pistons adapted to alternately open and close the ports in said pistons, means for connecting said double-acting valve member to said reciprocating head member, a double-acting motor mounted on said support means, a plunger rod extending into said motor slidably connected with the reciprocating stock feeding member and pivotally secured to said gripping dog, a piston carried by said plunger rod, a second piston connecting said pistons to permit separation thereof, port means connecting the ends of said pump chamber with the respective ends of said motor, an adjustable stop carried by said support means, means interconnecting said stop means and second-mentioned piston to facilitate adjustment of the stroke of said reciprocating stock feeding slide, said pump chamber being provided with a reservoir chamber, and a spring loaded dash pot structure communicating with said reservoir chamber to place the fluid therein under initial pressure.

20. A fluid transmission system, comprising motor means, pump means hydraulically connected to said motor means for operating said motor means, adjustable pistons mounted in said motor means to regulate the stroke thereof, and a reservoir associated with the system for receiving excess fluid when the stroke of said motor means is regulated by adjusting said pistons.

21. A fluid transmission system, comprising a fluid motor of the reciprocating piston type, pump means in said system hydraulically connected to the motor means for operating said motor means, said motor means including a pair of adjustable piston members arranged to be moved toward and away from one another to regulate the stroke of said motor means, means for regulating said pistons, and reservoir means associated with said system for receiving excess fluid therefrom when said pistons are adjusted to shorten the stroke of said motor.

22. A fluid transmission system for feeding mechanisms, comprising a reciprocating piston type motor, a pair of pistons mounted in said motor, a plunger rod connecting said pistons, means for adjusting said pistons on said plunger rod for regulating the stroke of the plunger rod, pump means operatively and hydraulically connected with said motor for reciprocating said piston and plunger rod, reservoir means having communication with said pump means, and means associated with said system for allowing excess fluid therein to be returned to said reservoir means when the pistons in said motor are adjusted for reciprocating strokes smaller than the cylinder length of said motor.

23. A fluid transmission system for feeding mechanisms, comprising a reciprocating piston type motor, a pair of pistons mounted in said motor, a plunger rod connecting said pistons, means for adjusting said pistons on said plunger rod for regulating the stroke of the plunger rod, pump means operatively and hydraulically connected with said motor for reciprocating said piston and plunger rod, reservoir means having communication with said pump means, means associated with said system for allowing excess fluid therein to be returned to said reservoir means when the pistons in said motor are adjusted for reciprocating strokes smaller than the cylinder length of said motor, and means for cushioning said pistons as they reach the end of their stroke.

24. A fluid transmission system, comprising a fluid motor of the reciprocating piston type, pump means in said system hydraulically connected to the motor means for operating said motor means, said motor means including a pair of adjustable piston members arranged to be moved toward and away from one another to regulate the stroke of said motor means, means for regulating said pistons, reservoir means associated with said system for receiving excess fluid therefrom when said pistons are adjusted to shorten the stroke of said motor, and a spring-loaded dash pot structure associated with said pump means to impose a slight pressure on said system and thereby permit operation of said system in various angular positions.

JOHN HALLER.

REFERENCES CITED

The following references are of record in the file of this patent:

UNITED STATES PATENTS

| Number | Name | Date |
|---|---|---|
| 2,379,002 | Haller | June 26, 1945 |